Dec. 11, 1928.  1,695,128
A. O. VESTINE
MACHINE FOR PICKING POULTRY
Filed March 17, 1928  2 Sheets-Sheet 1
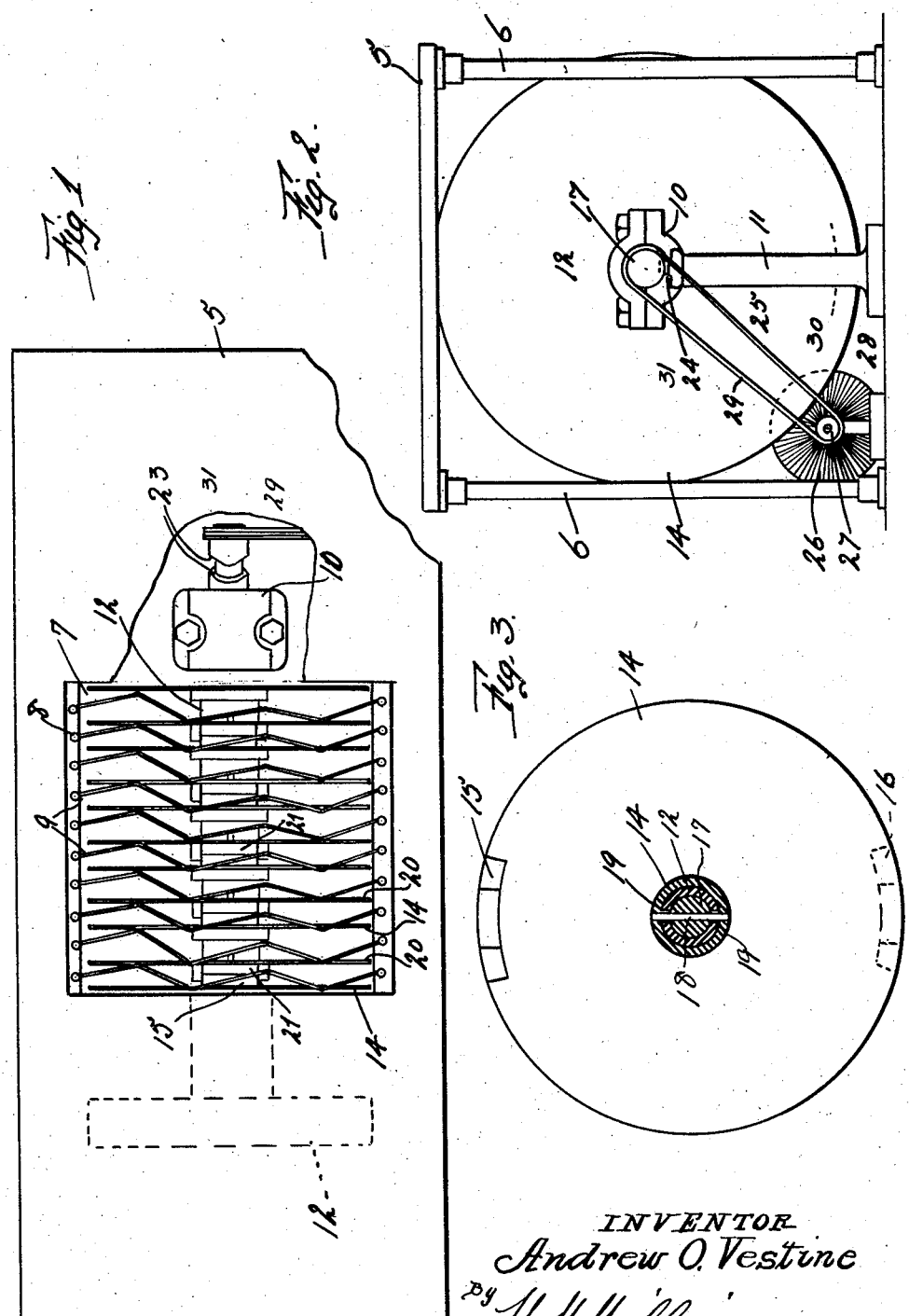
INVENTOR
Andrew O. Vestine
By W. H. Williamson
Atty.

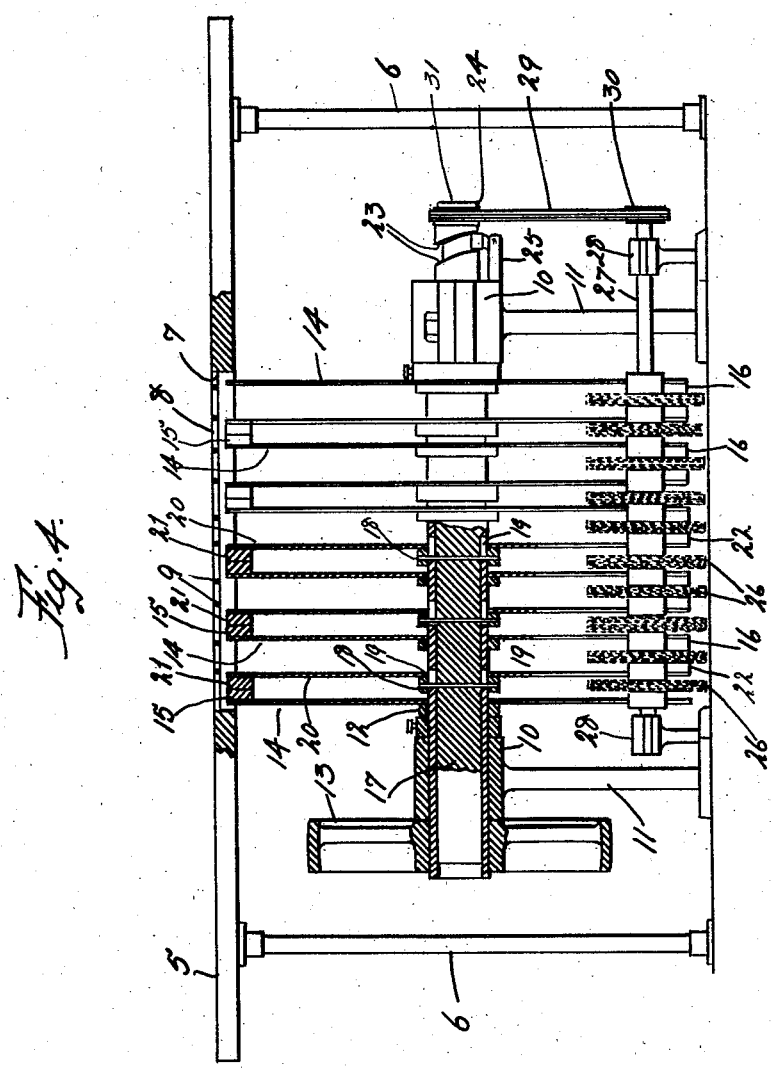

Patented Dec. 11, 1928.

1,695,128

UNITED STATES PATENT OFFICE.

ANDREW O. VESTINE, OF PHILADELPHIA, PENNSYLVANIA.

MACHINE FOR PICKING POULTRY.

Application filed March 17, 1928. Serial No. 262,345.

My invention relates to new and useful improvements in a machine for picking poultry and has for its primary object to provide an exceedingly simple and effective device of this character which will pluck the feathers in simulation of hand picking.

Another object of my invention is to provide a plurality of revolving members carrying gripping elements, to travel beneath a supporting grating and to grasp any poultry feathers protruding through said grating so as to pluck them from the body of the poultry.

A further object of my invention is to provide gripping mechanism of unique construction.

With these ends in view, this invention consists in the details of construction and combination of elements hereinafter set forth and then specifically designated by the claims.

In order that those skilled in the art to which this invention appertains may understand how to make and use the same, I will describe its construction in detail referring by numerals to the accompanying drawings forming a part of this application, in which:

Fig. 1, is a plan view of the machine for picking poultry constructed in accordance with my invention, a portion of the table being broken away.

Fig. 2, is an end view thereof.

Fig. 3, is a face view of one of the revolving members or discs carrying the gripping elements with its hub and the shafts shown in section.

Fig. 4, is a side elevation of the machine with parts broken away and shown in section to illustrate details of construction.

In carrying out my invention, 5 represents a table or other suitable supporting means mounted on legs 6 constituting a frame.

The table has an opening 7 therethrough with a grating 8 disposed across it and this grating is composed of spaced bars 9 of zigzag formation so that feathers protruding through the grating will be in different positions relative to the gripping elements to be presently described.

Beneath the table are mounted suitable bearings 10 on stanchions 11 or their equivalents and in these bearings is journalled the hollow shaft 12 revoluble by any desirable prime mover through the medium of the pulley 13 on said shaft.

On the hollow shaft are fixed a number of spaced flexible members or discs 14 to revolve therewith and at diametrically opposite locations on opposite faces of these discs are mounted gripping elements 15 and 16 in the form of pads preferably of slightly compressible material, it being understood that the endmost members or discs need have but one gripping member thereon.

Within the hollow shaft 12 is another shaft 17 carrying pins 18 the ends of which project through longitudinal slots 19 in the hollow shaft so that both shafts will revolve in unison while permitting a longitudinal sliding movement of the inner shaft 17.

On the hollow shaft 12 between the members 14 are slidably mounted other flexible members or discs 20 connected with the pins 18 so as to move with the inner shaft and like the members 14 said other members 20 have gripping elements 21 and 22 mounted on opposite faces at diametrically opposite locations but reverse to those on the first mentioned discs. In other words, examining the gripping elements at the tops of the discs in Fig. 4, the gripping elements 15 are on the right hand side of the discs 14 while the elements 21 on discs 20 are on the left hand side.

When the parts are in the positions shown in Fig. 4 the gripping elements 15 and 21 of adjacent members or discs are co-operating or in contact so that they will grip anything which may have entered between them but the gripping elements 16 and 22 and the bottom of the machine are out of contact and will have released anything that may have been gripped by them.

By sliding the inner shaft 17 endwise from the position shown in Fig. 4, the members or discs 20 will be moved away from the members 14 on one side of members 20 and moved toward the members 14 on the other side of said members 20 so as to bring the gripping elements 16 and 22 into contact while separating the gripping elements 15 and 21.

This action should be so timed that the contact of the gripping elements take place when they are at or near the top of the machine, preferably after passing the vertical center and the separation thereof will occur simultaneously therewith at the bottom of the machine.

The sliding or reciprocating movement of the inner shaft 17 and the associated members or discs can be accomplished by providing said shaft with cam surfaces 23 or their equivalent which coact with a cam operator 24 such as a roller in a fixed position on a bracket 25 so that during each revolution of the shafts the inner one will also make a complete to-and-fro movement.

The gripping elements all travel in close proximity to the grating below the same and therefore any feathers protruding through the grating will be in the path of travel of said gripping elements and may be clutched between them and plucked from the fowl resting on said grating.

During operation a fowl is placed upon the grating and moved about so that the bars of said grating will cause the feathers to "stand out" and protrude through the grating into the path of travel of the gripping elements.

As the gripping elements approach the grating or top of the machine they are in separated positions to permit their passage about the feathers and when in a position to grasp the feathers, said gripping elements are closed or brought into contact and as they move away from the grating they will pluck the feathers from the fowl similar to manner in which they would be plucked by human hands.

As the gripping elements approach the bottom of the machine they are moved away from one another and the feathers are released. The above description refers to both sets of the gripping elements but since one set is at the top while the other set is at the bottom one of said sets is grasping feathers while the other set is releasing them.

So long as the feathers are dry they will usually drop when released by the gripping elements but to insure their removal from said gripping elements as when wet or damp, or when the machine is working at high speed, I provide a number of brushes 26 mounted on a countershaft 27 journalled in suitable bearings 28 and revolved in any desirable manner as by a belt 29 running over a pulley 30 on the countershaft 27 and another pulley 31 on the shaft 17.

The brushes project in between the members 14 and 20 as indicated in Fig. 2 so as to engage any of the gripping elements at the bottom of the machine.

Of course I do not wish to be limited to the exact details of construction as herein shown, as these may be varied within the limits of the appended claims without departing from the spirit of my invention.

Having thus fully described my invention, what I claim as new and useful is:—

1. A machine for picking poultry comprising an open work fowl support through which the feathers may project, spaced members having portions traveling in close proximity to the support on the side opposite to that on which the fowl rests, other members located between the first mentioned members and traveling therewith, the second mentioned members being movable to and from the others, and gripping elements on opposite faces of all the members at diametrically opposite points.

2. In a machine for picking poultry, a hollow shaft having longitudinal slots, an inner shaft slidably mounted in the hollow shaft, members fixed on the hollow shaft in spaced relation, other members slidably mounted on the hollow shaft and located between the first mentioned ones, pins passing through the inner shaft and projecting through the slots into portions of the second mentioned members whereby the two shafts and all members may revolve in unison and each of said second mentioned members move to and from the other members on both sides thereof upon sliding movement of the inner shaft, gripping elements positioned at diametrically opposite locations on opposite faces of the members whereby one set are in contact when the other set are separated, means to support a fowl in proximity to gripping members where they close, means to revolve the shafts and associated parts, and means to slide the inner shaft to and fro during each revolution.

3. The structure set forth in claim 2, in combination with brushes revolubly mounted adjacent the members and projecting in between said members at the bottom of the machine.

4. In a device of the character stated, a plurality of spaced discs revolubly mounted, alternate ones being reciprocal, and gripping elements positioned at diametrically opposite locations on opposite faces of the discs whereby one set of elements is in operative condition when the other set is in inoperative condition.

5. The structure set forth in claim 4 in combination with a table having an opening therethrough into which the edges of the discs project, a grating including zig-zag bars disposed across the opening in the table, and brushes coacting with the discs to clean the surfaces thereof.

6. In a device of the character stated; a plurality of spaced flexible members revolubly mounted, means to reciprocate alternate members, and gripping elements carried by said members and positioned at diametrically opposite locations on opposite faces thereof.

In testimony whereof, I have hereunto affixed my signature.

ANDREW O. VESTINE.